United States Patent Office.

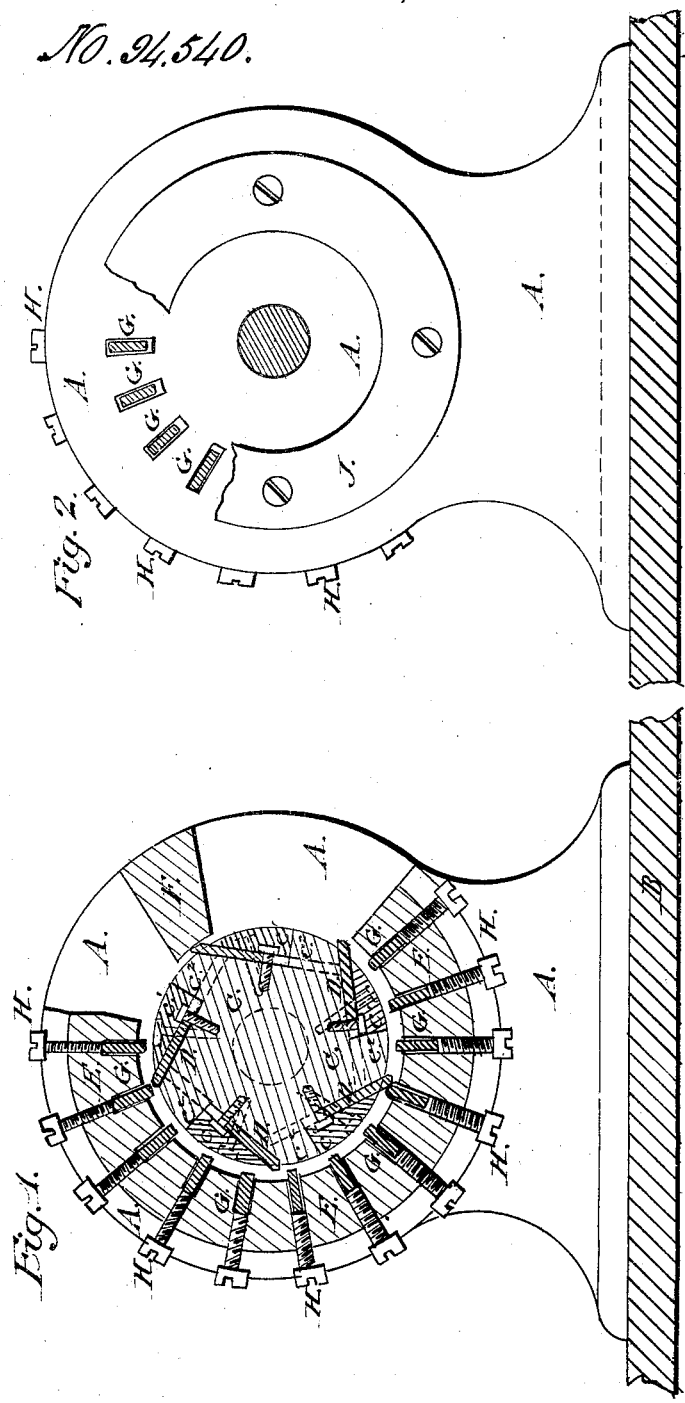

CHARLES S. BAILEY, OF NEW YORK, N. Y.

Letters Patent No. 94,540, dated September 7, 1869.

IMPROVED HULLING-MILL.

The Schedule referred to in these Letters Patent and making part of the same.

*To all whom it may concern:*

Be it known that I, CHARLES S. BAILEY, of New York, in the county of New York, and State of New York, have invented a new and improved Cylindrical Hulling-Mill; and I do hereby declare that the following is a full, clear, and exact description thereof, which will enable others skilled in the art to make and use the same, reference being had to the accompanying drawings, forming part of this specification, in which—

Figure 1 is a vertical cross-section of my improved hulling-mill.

Figure 2 is an end view of the same, part being broken away to show the construction.

Similar letters of reference indicate corresponding parts.

My invention relates to an improvement in machines for hulling cotton and other seed; and It consists in providing the end plates with radial slots, in continuation of the slots in the concave, whereby the knives are enabled to be removed singly through the end plates; and in holding the knives in place within the concave, by means of annular plates, removably attached to the end plates, all arranged as will be hereinafter more fully described.

A are the end plates of the mill, which are connected to each other and held in their proper relative positions by long bolts, and the lower parts of which are secured to the bed-plate B of the machine.

C is a cylinder, which may be of any desired length, the journals of which work in bearings in the end plates or frames A, and to which motion may be given by any desired power.

From the face of the cylinder C, are cut five longitudinal segments, $c^1$, which segments may be in the form shown in fig. 1, that is to say, with a solid shoulder, $c^2$, upon the body of the cylinder, against which the rear edges of the said segments rest.

The knives D are then attached to the plane surfaces of the cylinder, by screws passing through slots in the said knives, and screwing into the body of the cylinder C, in the same manner as the knives are attached to the cutter-heads of planers. The segments $c^1$ are then placed upon the knives and screwed to the cylinder C.

E is a concave box or casing, the ends of which are securely attached to the end plates or frames A, and which extends about two-thirds around the cylinder C, leaving an open space for the ingress and discharge of the seed. This space may be divided into two parts by a bar or beam, F, so as to form separate ingress and discharge-openings, as shown in fig. 1.

In the inner surface of the concave F are formed grooves, to receive the knives G, which grooves are continued through the end plates A, in the form of radial slots, as shown in fig. 2. The knives G are made of such a length that they may extend through both the end plates A, their ends being flush with the outer surface of said plates.

This construction and arrangement enable any one of the knives G to be removed when desired, without disturbing the other knives. The knives G are moved forward as they become worn, to keep them in proper working-position, by the set-screws H, which pass in through the concave E, and the forward ends of which rest against the back edges of the knives G, as shown in fig. 1.

The ends of the knives G are covered, and said knives are kept from longitudinal movement by the ring-plates I, secured to the outer surfaces of the end plates A, by screws or bolts, as shown in fig. 2.

I do not claim the cylinder C, with its adjustable knives, as herein shown, nor a concave provided with adjustable knives, for these I know to be old; but What I do claim as new, and desire to secure by Letters Patent, is—

The end plates A, slotted radially in continuation of the slots in the concave E, whereby the knives are enabled to be removed singly through the end plates, said knives being held in place by the removable annular plates J, all arranged as showd and described, and for the purpose specified.

The above specification of my invention signed by me, this 23d day of January, 1869.

CHARLES S. BAILEY.

Witnesses:
FRANK BLOCKLEY,
JAMES T. GRAHAM.